United States Patent [19]

Douglas et al.

[11] Patent Number: 4,662,656
[45] Date of Patent: May 5, 1987

[54] PIPELINE COUPLING

[75] Inventors: Stephen B. Douglas, Boxborough; Allan T. Fisk, Needham, both of Mass.

[73] Assignee: Foster-Miller, Inc., Waltham, Mass.

[21] Appl. No.: 805,447

[22] Filed: Dec. 5, 1985

Related U.S. Application Data

[63] Continuation-in-part of Ser. No. 530,489, Sep. 9, 1983, abandoned.

[51] Int. Cl.⁴ .............................................. F16L 17/02
[52] U.S. Cl. ..................................... 285/39; 285/112; 285/321
[58] Field of Search ................... 285/321, 112, 39, 369

[56] References Cited

U.S. PATENT DOCUMENTS

| | | |
|---|---|---|
| 2,440,452 | 4/1948 | Smith . |
| 2,479,960 | 8/1949 | Osborn .......................... 285/112 X |
| 2,521,127 | 9/1950 | Price . |
| 2,901,269 | 8/1959 | Rickard . |
| 3,027,179 | 3/1962 | Wiltse . |
| 3,381,983 | 5/1968 | Hanes .................... 285/321 |
| 3,398,977 | 8/1968 | Yoneda ........................ 285/321 X |
| 3,439,944 | 4/1969 | Leutenegger . |
| 3,704,901 | 12/1972 | Borner ............................ 285/286 X |
| 3,712,648 | 1/1973 | Clifford ............................ 285/321 |
| 3,791,678 | 2/1974 | DePutter . |
| 3,836,183 | 9/1974 | Battle . |
| 3,920,270 | 11/1975 | Babb, Jr. ........................ 285/321 X |
| 3,955,834 | 5/1976 | Ahlrot . |
| 4,037,859 | 7/1977 | Clements . |
| 4,111,464 | 9/1978 | Asano et al. .................... 285/321 X |
| 4,116,474 | 9/1978 | Wolf . |
| 4,138,148 | 2/1979 | Zaremba . |
| 4,471,978 | 9/1984 | Kramer . |

FOREIGN PATENT DOCUMENTS

| | | | |
|---|---|---|---|
| 269559 | 7/1964 | Australia ............................ 285/321 |
| 695250 | 9/1964 | Canada ................................ 285/321 |
| 1305096 | 8/1962 | France ................................ 285/321 |
| 166718 | 7/1921 | United Kingdom . |
| 1113694 | 5/1968 | United Kingdom ................ 285/321 |

*Primary Examiner*—Thomas F. Callaghan

[57] ABSTRACT

Pipe coupling apparatus including a tubular female coupling structure and a tubular male coupling structure sized to fit within and mate with the female coupling structure, one coupling structure including a housing and a locking ring that is radially deformable within an annular supporting groove of the housing, the other coupling structure including a tapered surface for biasing the ring to vary its radius as the coupling structures are brought together and an annular locking groove for receiving the ring when it is aligned with the locking groove as the coupling structures are moved further together and the ring springs back toward its undeformed shape, one coupling structure carrying an annular seal to provide a fluid-tight seal between said coupling structures.

23 Claims, 11 Drawing Figures

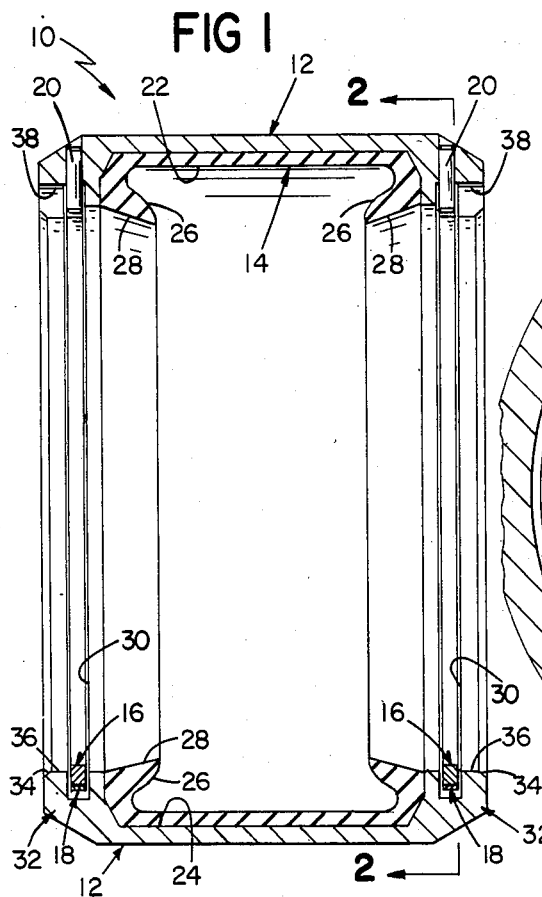
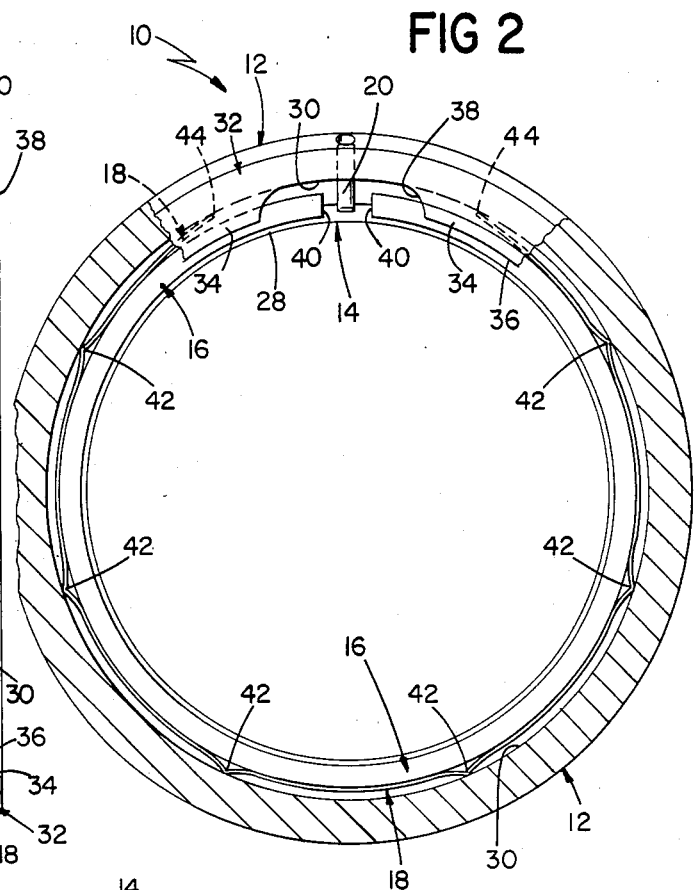
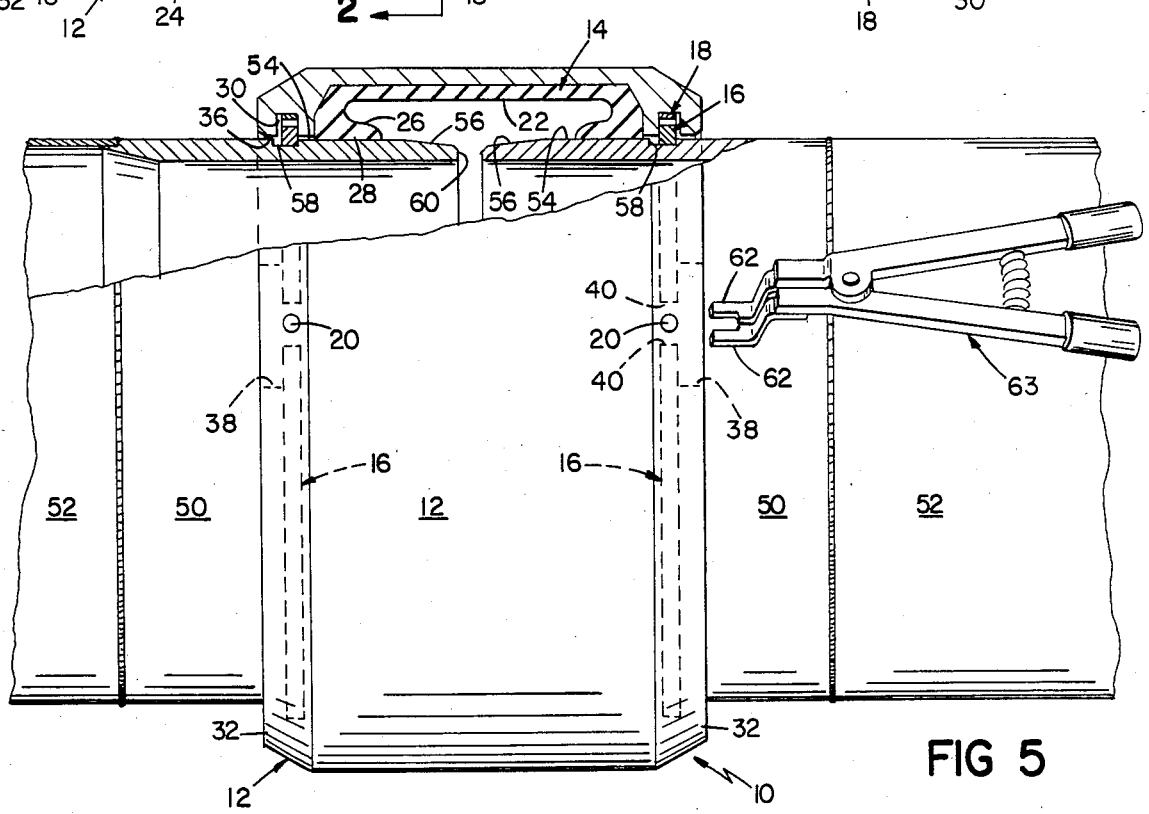

FIG 3
FIG 4
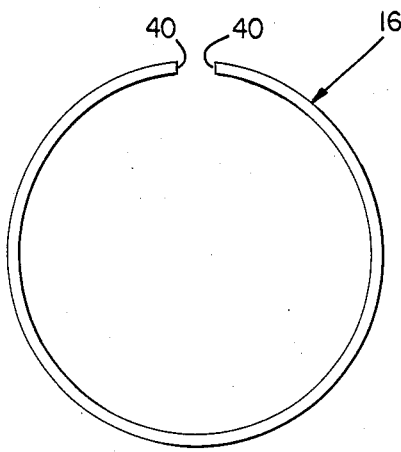
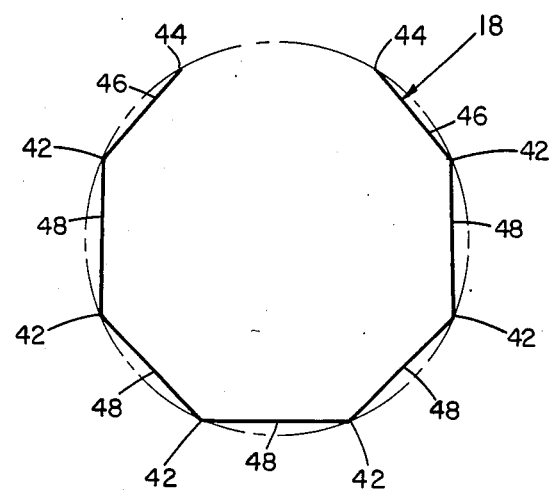
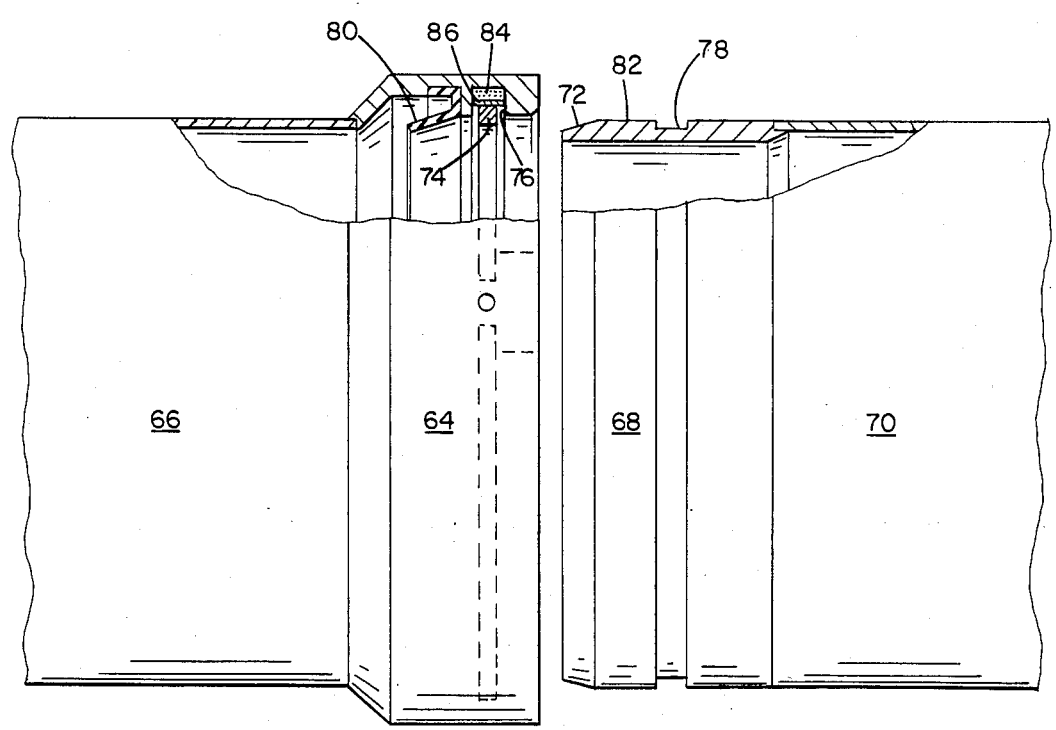
FIG 6

PIPELINE COUPLING

This invention was made with Government support under DAAK 70-82-C-0132 contract awarded by the Department of Defense. The Government has certain rights in this invention.

This is a continuation-in-part of copending U.S. application Serial No. 530,489 filed Sept. 9, 1983 now abandoned and entitled Pipeline Coupling.

FIELD OF THE INVENTION

The invention relates to pipeline construction and more especially to pipe coupling structures that are particularly useful for laying pipeline in the field.

BACKGROUND OF THE INVENTION

Pipe couplings are used to join adjacent pipe sections (e.g., in a pipeline) so that they can be securely fastened together and sealed to each other. Frequently it is desired to field lay pipeline, for example, petroleum pipelines for military applications will normally be layed on the surface along road ditches, railroad rights of way, stream beds and across open areas so that clearing and grading is not required. Lightweight thin wall pipe, in lengths of approximately twenty feet, allow delivery of pipe sections to the job site by standard military cargo truck and a team of six to eight people to handle the pipe sections during the stringing and joining operations without the aid of materials handling equipment. A present military standard coupling is a lightweight steel grooved end pipe and split ring system which involves an assembly time of about five minutes to align, assemble and tighten the coupling to connect two sections of eight inch diameter pipe.

SUMMARY OF THE INVENTION

In general, the invention features an easily and quickly connecting pipe coupling system that includes a deformable locking ring carried in an annular support recess in one coupling structure. In accordance with one feature of the invention, there is provided means to center the locking ring in the annular recess that includes resilient material (for example, of foam rubber or plastic) and an annular covering band (for example, of metal or plastic) between the locking ring and the annular surface of the resilient material, in an arrangement that excludes dirt, liquids and other contaminants from the annular recess and allows the locking ring to slide on the covering band. During coupling insertion with a cooperating coupling structure, the ring remains centered in the annular recess by the centering action of the composite band structure while being radially deformed by the action of a camming surface on the other coupling structure and then snaps into place in a latch recess in the other coupling structure. An annular seal between the two coupling structures is also brought into position during insertion.

In accordance with another feature of the invention, there is provided a locking ring of C-shape configuration that has concentric inner and outer surfaces, the region between the leading edge of the locking ring and its cylindrical inner surface is an inclined transition surface, and the corner between the trailing edge of the locking ring and its cylindrical inner surface is an acute angle. The leading corner transition surface eases coupling engagment and the acute angle trailing corner of the locking ring seats at the base of a radial extending end wall of the latch recess in the other coupling structure. In preferred embodiments, the locking ring has a supplemental inclined leading edge surface portion that produces a reaction force aligned with the acute angle of the trailing edge, the cooperating annular latch recess has an axial length of at least three times the axial length of the locking ring, and the coupling structures include frustoconical surfaces that are adapted to mate and provide supplemental sealing action when the male and female coupling structures in latched engagement are subjected to axial compressive forces.

In particular embodiments the annular seal is made of material such as fluorosilicone, nitrile or epichlorohydrin (ECO) rubber, has an annular flexible lip, and is disposed in a recess in a female coupling structure adjacent the annular locking ring support recess. The locking ring is C-shaped, and an access port in the flange structure provides access to the spaced ends of the C-shaped locking ring to permit disassembly of the coupling by expanding the ring by separating its ends. Aligning means in the form of a projection circumferentially locates the spaced ends of the C-shaped locking ring adjacent the access port. The annular latch recess is on the surface of the cooperating male coupling structure and includes a radial end surface that receives the acute angle trailing corner of the locking ring that is spaced from a tapered locking ring camming surface by a seal surface against which the lip of the annular seal seats when the locking ring is in the latch recess. The latch groove has a diametrical depth slightly greater than the undeformed inner diameter of the locking ring so that the ring remains slightly stressed when the coupling structures are latched together. In one embodiment the female coupling structure has two locking rings (each of which is appropriately centered as by a spring strip that contacts alternating portions of the outer surface of the locking ring and the inner surface of its support groove or preferrably by a composite closed cell resilient foam - protective metal strip assembly) for receiving two male coupling structures which are each connected to metal pipe sections that are at least about four inches in diameter; and the annular seal is disposed between the two locking rings and has two opposed annular lips for contacting both of the male coupling structures inserted in it and expanding by fluid pressure during operation to improve the seal. In other embodiments, the female coupling structure is connected to a pipe section and has only one locking ring. In particular embodiments, the support groove is in a flange that has a cylindrical surface of axial length that is less than five times the axial width of the support groove.

DESCRIPTION OF PARTICULAR EMBODIMENTS

The structure and operation of particular embodiments of the invention will now be described after first briefly describing the drawings.

Drawings

FIG. 1 is a vertical sectional view of a female coupling structure according to the invention;

FIG. 2 is an end elevation, partially broken away, of the FIG. 1 coupling structure;

FIG. 3 is an elevation of a locking ring for the FIG. 1 coupling structure;

FIG. 4 is an elevation of a centering spring for the FIG. 1 coupling structure;

FIG. 5 is a plan view, partially broken away, showing the FIG. 1 female coupling structure rotated slightly from the position of FIG. 1 and connected to two male coupling structures welded to pipe sections;

FIG. 6 is a vertical elevation, partially broken away, of an alternative embodiment;

Figure 7:
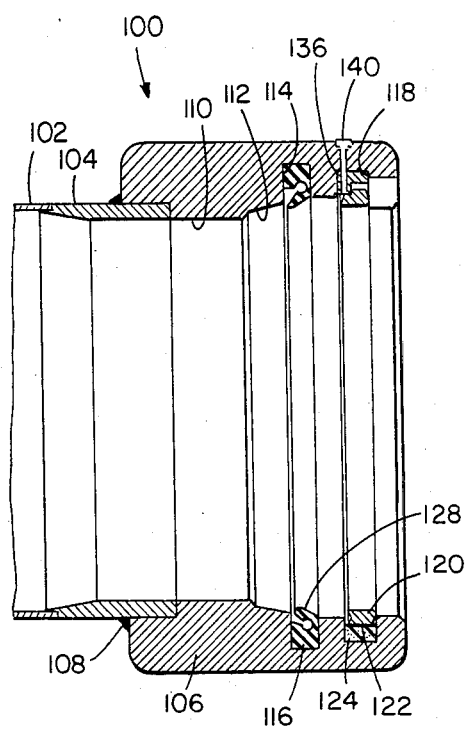
FIG. 7 is a vertical sectional view of a female coupling structure of still another embodiment.
Figure 9:
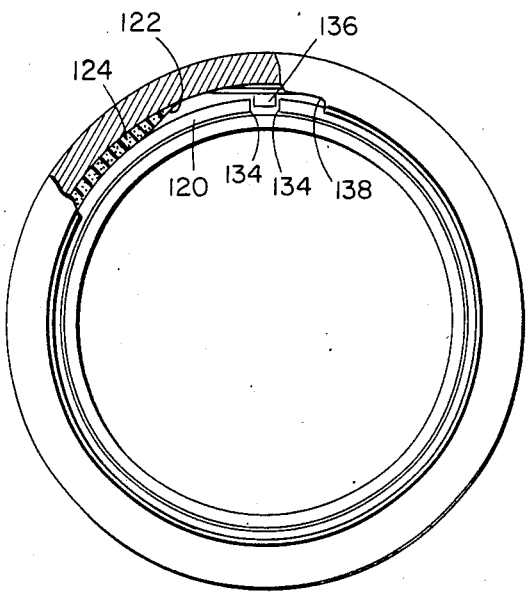
Figure 8:
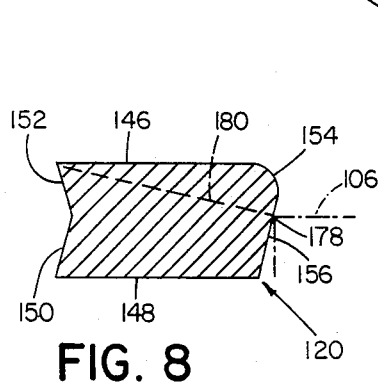
Figure 10:
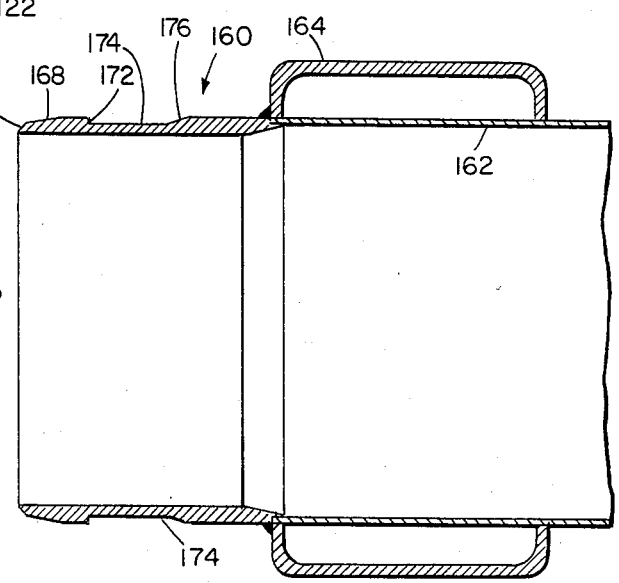
Figure 11:
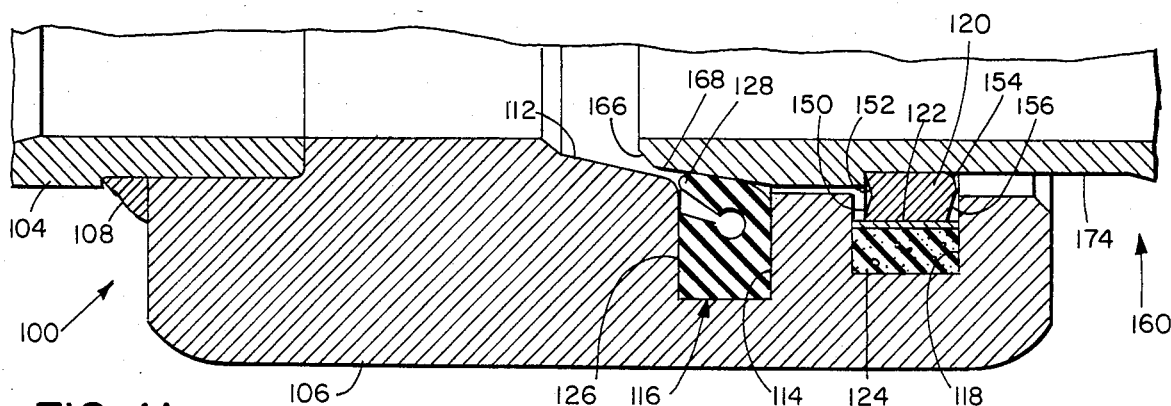

FIG. 8. is a sectional diagrammatiac view of the locking ring for the FIG. 7 coupling structure;

FIG. 9 is an end elevation, partially broken away, of the FIG. 7 coupling structure;

FIG. 10 is a vertical sectional view of a male coupling structure for cooperation with the FIG. 7 female coupling structure; and FIG. 11 is a sectional view, showing portions of the FIG. 7 female coupling structure connected to the FIG. 10 male coupling structure.

STRUCTURE

Referring to FIG. 1, there is shown female coupling structure 10 for use with eight inch diameter steel pipe sections and made of aluminum (abrasion resistant hard coat anodized) housing 12, annular resilient seal 14, locking rings 16, centering springs 18 and pins 20.

Annular seal 14 is made of rubber and has base portion 22 conforming to the shape of annular recess 24 of housing 12 and two spaced annular lip portions 26 that face each other and are connected to the axial ends of base portion 22. Lips 26 have slanted surfaces 28 for contacting cooperating seal surfaces of male structures inserted in female coupling structure 10. Surfaces 28 make 17° angles with the longitudinal axis of coupling structure 10 and lips 26 define 8¼ inch diameter openings.

Referring to FIGS. 1 and 2, both centering spring 18 and locking ring 16 are received within annular groove 30 of housing 12, and it is seen that centering spring 18 deforms around the periphery of ring 16, and contacts alternating portions of the annular surface of groove 30 and ring 16, centering ring 16 in groove 30. Each annular groove 30 is formed in housing flange 32, the two flanges being spaced about 5¼ inches apart and each flange 32 defining a cylindrical length of about one inch with 45° chamfer 34 at the outside opening about 8 ⅜ inches in diameter and having an axial length of about onw inxh qirh 45° chamfer 34 at the outside edge. Each groove 30 is about one centimeter wide and has an inside diameter of about 9½ inches. The land 36 of flange 32 is ¼ inch long. Formed in the outer wall of each flange 32 is an access opening 38 (FIG. 2) that exposes ends 40 of locking ring 16 to permit introduction of a disassembly (release) tool.

Pin 20 is a ¼ inch by ⅞ inch roll pin which locks into a hole in housing 12 in position with a projecting end between ends 40 of locking ring 16, to locate ends 40 behind removal opening 38.

Locking ring 16 (FIG. 3) is of C-shape configuration and is made of hardened steel. It has an inner diameter of 8⅜ inches, is about ¾ centimeter wide, about ¾ centimeter thick in cross-section and preferrably has a cross-sectional configuration of the type shown in FIG. 8. The distance between ends 40 of locking ring 16 is ½ inch. A lubricating coating such as phosphate and oil or Teflon is carried by ring 16.

Centering spring 18 (FIG. 4) is bent from flat tempered spring steel that is about ¼ inch wide, and bears an oil/phosphate or other appropriate lubricating coating. Bends 42 and ends 44 lie on a 9½ inch diameter circle, as shown in the dashed line in FIG. 4. Sections 46 are three inches long, and sections 48 are four inches long. Adjacent sections 46 and 48 form 137° angles between them, and adjacent sections 48 form 130° angles between them.

Referring to FIG. 5, female coupling structure 10 is shown connected to two identical steel male coupling (pipe nipple) structures 50, each welded to eight inch diameter thin wall steel pipe sections 52. Each male coupling structure 50 has a length of 5¾ inches, a smooth (125 finish) outer surface 54 of 8¾ inch diameter, eight inch nominal inner diameter, a smooth (125 finish) tapered surface 56 making a seven degree angle with outer surface 54, and a locking groove 58 which is about 1.1 centimeter wide and has a depth of about 0.09 inch. Tapered surface 56 tapers to 45° chamfered end surface 60.

Operation

In coupling assembly of two pipeline sections 52, the two sections 52 are aligned with coupling structure 10 positioned between the nipple end surfaces 60. The nipples 50 are simply slid into female coupling structure 10 to effect coupling of the two pipe sections 52. During insertion, each locking ring 16 is expanded against spring 18 by tapering cam surface 54, slides along seal surface 56, and snaps into locking groove 58 where it remains stressed by the base of the latch groove 58 (as its unstressed inner diameter is slightly less than the root diameter of groove 58), and interferes with the side walls of grooves 30, 58 to lock the female and male coupling structures together. Push in force of each nipple 50 is about seventy pounds. Chamfers 34, 60 and the chamfer onlocking ring 16 facilitate insertion. During insertion, surfaces 56 also push back lips 26 of annular seal 14, and they make a seal around the entire periphery of surface 54. Surface 28 of annular seal 14 preferably is greased prior to insertion to reduce its tendency to be carried axially with male coupling structure 50.

When fluid is passing through pipe sections 52 under pressure, it flows through the gap between the ends of male coupling structures 50 into the region within seal 14, exerting substantial axial force on the coupling and causing opposing portions 22, 26 of seal 14 to be pushed outward against housing 12 and inward against male structure 50, thereby improving the seal.

Locking rings 16 prevent disengagement of the male and female coupling structures and transfer all the mechanical load (e.g., tension, compression, shear or bending moments) from male structures 50 to housing 12. Limited axial and radial displacement and angular deflection of two degrees between adjacent pipe sections 52 are permitted because grooves 30, 58 are wider than locking ring 16 and the adjacent flange surfaces are relatively short. The coupling is suitable for joining surface pipeline sections for overland transportation of water, motor gasoline, diesel fuel, and jet fuel in support of tactical military operations and withstands operating pressures of 450 psi at two degree deflection of adjacent pipeline sections.

To disconnect female coupling structure 10 from male coupling structures 50, tips 62 of disassembly tool 63 are inserted into opening 48 and used to pry apart ends 40 of locking ring 16, thereby increasing its inner diameter so that it is larger than the outer diameter of surface 54, permitting male coupling structure 50 to be slid out from female coupling structure 10.

Coupling structures 10, 50 can thus be quickly and easily assembled and disassembled, the assembly time being less than twenty seconds in contrast with the five minutes required for the split ring type coupling. The coupling thus facilitates rapid manual assembly without special tools, easy disassembly, and has excellent maintainability and lower cost characteristics than other pipeline coupling systems for comparable use.

In further embodiments (shown in FIGS. 6–11), appropriate for use in a mechanized pipe laying system for military field use, instead of using a female coupling structure to connect two male structures on pipe sections, female coupling structure 64, 100 is welded on one eight inch pipe section 66, 102; and male coupling structure 68, 160 is welded on another eight inch pipe section 70, 162. With reference to FIG. 6, the coupling structures are slid together similar to the embodiment shown in FIGS. 1–5, with tapered surface 72 camming locking ring 74 in an expansion mode into groove 76 and then allowing ring 74 to snap into latch groove 78, locking coupling structures 64, 68 together. Annular seal lip 80 seats against cylindrical seal surface 82 and provides a fluid tight seal.

Also, in place of centering spring 18, other means may be used to center locking ring 16 (74, 120) in annular groove 30 (76, 118) in a uniform, compliant manner. For example, strip 84, 124 of compressible closed cell foam rubber within the groove 76, 118 and covered with thin metal band 86, 122 centers ring 74, 120, restricts materials such as silt and freezable liquids from collecting between ring 74, 120 and groove 76,118 (that might restrict or limit expansion of ring 74 for disassembly), and permits transverse sliding of ring 74, 120 without a tendency for grabbing interaction between the ring and the resilient centering material.

Referring to the further embodiment shown in FIGS. 7–11 and particularly to FIG. 7, female coupling structure 100 is secured to twenty-two centimeter diameter steel pipe section 102 (of about two millimeter wall thickness) by transition pipe section 104 (of about eight millimeter wall thickness). Housing 106 is secured by weld 108 to transition pipe 104 and has formed therein cylindrical surface 110, tapered seat surface 112, groove 114 which receives annular resilient seal 116, and groove 118 in which is disposed lock ring 120, together with centering strip 124 of foam rubber and stainless steel protective strip 122 (that has a thickness of about ¼ millimeter). Strip 122 (as does similar strip 86) excludes dirt and other contaminants from groove 118 and allows ring 120 to slide (instead of having a grabbing tendency where ring 120 is centered solely by a member of foam rubber).

Annular seal ring 116 has base portion 126 conforming to the shape of annular recess 114 and annular lip portion 128 is adapted to contact inclined surface 168 of cooperating male structure 160 (FIGS. 10 and 11).

With reference to FIGS. 7, 8 and 9, locking ring 120 is of C-shaped configuration, is made of spring steel, and has a cross-section as indicated in FIG. 8, with concentric inner and outer surfaces 146, 148 respectively, surfaces 150, 152 defining a generally symmetrical V-shaped groove on its trailing side (surface 156 defining an acute angle of about 75° with inner surface 146), and an inclined surface 156 and a rounded (or chamfered) corner 154 on its leading side. The inner diameter of ring 120 is about twenty-one centimeters, its axial length is about 1.6 centimeters and its radial thickness is about 0.8 centimeter. The distance between ends 134 is about 1.5 centimeters and positioning projection 136 (key) (of about 1.2 centimeter width) is disposed between ends 134 of ring 120 to locate those ends behind removal opening 138. Key 136 is secured with fastener 140 which also secures metal strip 122 that extends circumferentially around groove 118, the end portions of strip 122 being located in overlapping relation opposite key 136.

Referring to FIG. 10, steel male coupling stucture 160 is welded to twenty-two centimeter diameter steel pipe section 162 and carries housing 164 of the same outer diameter as coupling 106 that provides coupling surface protection and may be engaged by cooperating automated pipe laying equipment. Coupling section 160 is of twenty-two centimeter diameter pipe that has a wall thickness of about eight millimeters. Smooth entrance surface 168 is tapered at an angle of about 7° and radial latch surface 172 defines one edge of latch recess 174 that has an axial length of about four centimeters; and is bounded at its other edge by inclined transition surface 176.

In coupling assembly, male section 160 is inserted into female section 100. During insertion, rounded edge 154 of lock ring 120 is cammed along inclined surface 168 until the acute trailing corner defined by surface 152 snaps past radial surface 172 and into the latch recess 174, in the position shown in FIG. 11. The coupled pipe assembly accommodates axial and angular movements (due to elongated latch recess 174) to a limiting position where inclined surfaces 112 and 168 mate. When the coupled pipes 102, 162 are subjected to tension forces (due for example to internal fluid pressures of 500 psi and above), the corner 178 of lock ring recess 118 contacts inclined surface 156 and produces a resulting force vector 180 that is substantially aligned with the opposite acute corner of ring 120 (as indicated in FIG. 8), reducing 'roll' tendencies of the lock ring. Limited axial and radial displacement and angular deflection of about four degrees between adjacent pipe sections 102, 162 are permitted. The coupling is suitable for joining surface pipeline sections for overland transportation of water, motor gasoline, diesel fuel, and jet fuel in support of tactical military operations and withstands operating pressures in excess of 500 psi at 4° deflection of adjacent pipeline sections.

To disconnect coupled structures 100, 160, tips of a suitable disassembly tool (similar to tool 64) are inserted into opening 138 against the opposed end surfaces 134 of lock ring 120, key 136 having a set back so that the ends 134 of the lock ring may be directly engaged. Expansion of the lock ring increases its inner diameter and compresses the centering strip 124, permitting male coupling 160 to be slid out of female coupling structure 100.

Coupling structures 100, 160 can thus be quickly and easily assembled and disassembled, facilitating rapid manual assembly without special tools, easy disassembly, and excellent maintainability and low cost characteristics.

While particular embodiments of the invention have been shown and described, various modifications will be apparent to those skilled in the art, and therefore it is not intended that the invention be limited to the disclosed embodiments or to details thereof and departures may be made therefrom within the spirit and scope of the invention.

What is claimed is:

1. Pipe coupling apparatus comprising
   a female coupling structure, and
   a male coupling structure sized to fit within and mate with said female coupling structure, one said coupling structure including a tubular member, and a radially deformable locking ring disposed in an annular support recess of said tubular member, and means to center said locking ring in said annular recess comprising an annular band of resilient material and an annular covering band between said locking ring and the annular surface of said resilient material, the other said coupling structure including a camming surface for biasing said ring to vary its radius as said male coupling structure is axially inserted into said female coupling structure and said coupling structures are brought together and an annular latch recess for receiving said ring when it is aligned with said latch recess as said one coupling structure is moved further and said ring springs back toward its undeformed shape, a said coupling structure carrying an annular seal member to provide a fluid-tight seal between said coupling structures when said locking ring is disposed in said latch recess.

2. The apparatus of claim 1 wherein said one coupling structure is said female structure and said other coupling structure is said male structure.

3. The apparatus of claim 2 wherein said female coupling structure includes two said support recesses and two said locking rings for receiving two said male coupling structures.

4. The apparatus of claim 1 wherein said resilient centering material is of foam rubber-type material and has a cylindrical surface disposed within said annular recess and said covering band is of cylindrical configuration and is seated against said cylindrical surface of said ring centering material.

5. The apparatus of claim 4 wherein said foam rubber-type material is of closed cell type.

6. The apparatus of claim 1 wherein said locking ring is of C-shape configuration with an opening between two ends, said one coupling structure includes aligning means in said annular support recess to fix the location of said opening of said locking ring, and said one structure includes an access opening to said annular groove to permit access to said two ends of said locking ring to permit insertion in the axial direction of a release tool to engage the ends of said locking ring and change the diameter of said locking ring by moving said ends, so that said coupling structures can be disconnected.

7. The apparatus of claim 1 wherein said tubular member includes a flange portion in which said annular support recess is formed, said support and latch recess having widths greater than the width of said locking ring, and the diametrical depth of said latch recess being proportioned to the undeformed adjacent diametrical surface of said locking ring so that said ring remains stressed when disposed in said latch recess, so that said coupling apparatus accommodates an angular offset of said coupling structures of at least about one degree and said coupling apparatus withstands operating pressures in excess of one hundred psi without leakage at said angular offset.

8. The apparatus of claim 1 wherein said locking ring is of C-shape configuration and has concentric inner and outer surfaces, an inclined transition surface between the leading edge of said ring and its inner surface, and the corner between the trailing edge of said ring and its inner surface being an acute angle.

9. The apparatus of claim 1 wherein said annular latch recess has an axial length of at least three times the axial length of said locking ring, and said coupling structures include frustoconical surfaces that are adapted to mate and provide seating action when said male and female coupling structures are subjected to axial compressive forces.

10. The apparatus of claim 9 wherein said locking ring is of C-shape configuration with an opening between two ends, said one coupling structure includes a projection in said annular support recess to fix the location of said opening of said locking ring, and said one structure includes an access opening to said annular groove to permit access in the axial direction to said two ends of said locking ring to permit insertion of a release tool to engage the ends of said locking ring and change the diameter of said locking ring by moving said ends, so that said coupling structures can be disconnected.

11. The apparatus of claim 10 wherein said one coupling structure is said female structure, and said other coupling structure is said male structure.

12. The apparatus of claim 11 wherein the axial length of said latch recess portion is less than five times the width of said locking ring.

13. The apparatus of claim 12 wherein said male structure is welded to a length of pipe section that has a diameter of at least about four inches and said tubular member has an inner diameter of at least about four inches.

14. Pipe coupling apparatus comprising
female coupling structure, and
male coupling structure sized to fit within and mate with said female coupling structure, said male coupling structure being welded to a length of pipe section that has a diameter of at least about four inches,
said female coupling structure including a tubular member that has an inner diameter of at least about four inches, a radially deformable locking ring of C-shape configuration disposed in an annular support recess of said tubular member, the trailing edge of said locking ring being defined by an acute angle, and means to center said locking ring in said annular recess comprising an annular band of resilient material and an annular covering band located radially between said locking ring and the annular surface of said resilient material,
said male coupling structure including a camming surface for biasing said ring to vary its radius as said male coupling structure is axially inserted into said female coupling structure and said coupling structures are brought together and an annular latch recess for receiving said ring when it is aligned with said latch recess and said ring springs back towards its undeformed shape, said annular latch recess including a radial end surface that receives said acute angle trailing corner of said locking ring
a said coupling structure carrying an annular seal member to provide a fluid-tight seal between said coupling structures when said locking ring is disposed in said latch recess, said latch recess being spaced from a tapered locking ring camming surface by a seal surface against which the lip of the annular seal seats when the locking ring is in the latch recess, and the leading edge of said locking ring including an inclined edge surface portion that produces a reaction force vector that is substantially aligned with the opposite acute corner of said locking ring when the coupling is subjected to tension forces and said inclined edge surface is engaged by the adjacent edge of said annular support recess.

15. Pipe coupling apparatus comprising
a female coupling structure,
a male coupling structure sized to fit within and mate with said female coupling structure,
one said coupling structure including a tubular member, and a radially deformable locking ring disposed in an annular support recess of said tubular member, said locking ring being of C-shape configuration, the leading edge of said ring including an inclined surface portion, and the corner between the trailing edge of said ring and its inner surface being an acute angle,
the other said coupling structure including a camming surface for biasing said ring to vary its radius as said male coupling structure is axially inserted into said female coupling structure and said coupling structures are brought together and an annular latch recess for receiving said ring when it is aligned with said support recess as said one coupling structure is moved further and said ring springs back toward its undeformed shape,
said inclined leading edge surface portion of said locking ring producing a reaction force vector that is substantially aligned with said acute angle corner of said trailing edge when said corner is seated against the base of said latch recess and said coupling is subjected to tension force such that said inclined edge surface is engaged by the adjacent surface of said annular support recess,
a said coupling structure carrying an annular seal member to provide a fluid-tight seal between said coupling structures when said locking ring is disposed in said latch recess.

16. The apparatus of claim 15 wherein said locking ring has cylindrical inner and outer surfaces to provide a ring of uniform radial thickness.

17. The apparatus of claim 15 wherein said annular latch recess has an axial length of at least three times the axial length of said locking ring, and said coupling structures include frustoconical surfaces that are adapted to mate and provide seating action when said male and female coupling structures are subjected to axial compressive forces.

18. The apparatus of claim 15 wherein said female structure is welded to a length of pipe section that has a diameter of at least about four inches.

19. The apparatus of claim 15 further comprising means to center said locking ring to facilitate insertion of said male coupling structure that includes resilient material disposed in said annular support recess and an annular covering band between said locking ring and the surface of said resilient ring centering material, said resilient ring centering material having a cylindrical surface disposed within said annular support recess and said covering band being of cylindrical configuration and seated against said cylindrical surface of said resilient ring centering material.

20. The apparatus of claim 19 wherein said resilient ring centering material is of the closed cell type and said annular covering band is of metal.

21. The apparatus of claim 15 wherein trailing edge surfaces of said locking ring define a generally symmetrical V-shaped groove with one of said trailing edge surfaces defining an acute angle of about 75° with said inner surface.

22. The apparatus of claim 21 wherein said female structure is welded to a length of pipe section that has a diameter of at least about four inches, said annular latch recess has an axial length of at least three times the axial length of said locking ring, and said coupling structures include frustoconical surfaces that are adapted to mate and provide seating action when said male and female coupling structures are subjected to axial compressive forces.

23. Pipe coupling apparatus comprising
a female coupling structure secured to a length of pipe section that has a diameter of at least about four inches, and
a male coupling structure sized to fit within and mate with said female coupling structure,
said female coupling structure including a tubular member, and a radially deformable locking ring disposed in an annular support recess of said tubular member, means to center said locking ring to facilitate insertion of said male coupling structure that includes resilient material of the closed cell type disposed in said annular support recess and an annular metal covering band between said locking ring and the surface of said resilient material, said locking ring being of C-shape configuration, the leading edge of said ring including an inclined surface portion, and the corner between the trailing edge of said ring and its inner surface being an acute angle,
said male coupling structure including a camming surface for biasing said ring to vary its radius as said male coupling structure is axially inserted into said female coupling structure and said coupling structures are brought together and an annular latch recess for receiving said ring when it is aligned with said latch recess as said female coupling structure is moved further and said ring springs back toward its undeformed shape, said annular latch recess having an axial length of at least three times the axial length of said locking ring,
said inclined leading edge surface portion of said locking ring producing a reaction force vector that is substantially aligned with said acute angle corner of said trailing edge when said corner is seated against the base of said latch recess and said coupling is subjected to tension force such that said inclined edge surface is engaged by the adjacent surface of said annular support recess,
a said coupling structure carrying an annular seal member to provide a fluid-tight seal between said coupling structures when said locking ring is disposed in said latch recess.

* * * * *